US011539266B2

(12) United States Patent
Müller

(10) Patent No.: US 11,539,266 B2
(45) Date of Patent: Dec. 27, 2022

(54) ELECTROMOTIVE FURNITURE DRIVE COMPRISING A DRIVE MOTOR WITH A BRAKE DEVICE

(71) Applicant: DEWERTOKIN GMBH, Kirchlengern (DE)

(72) Inventor: Sven Müller, Kichlengern (DE)

(73) Assignee: DEWERTOKIN TECHNOLOGY GROUP CO., LTD, Jiaxing (CN)

( * ) Notice: Subject to any disclaimer, the term of this patent is extended or adjusted under 35 U.S.C. 154(b) by 685 days.

(21) Appl. No.: 16/493,641

(22) PCT Filed: Mar. 13, 2018

(86) PCT No.: PCT/EP2018/056296
§ 371 (c)(1),
(2) Date: Sep. 12, 2019

(87) PCT Pub. No.: WO2018/167094
PCT Pub. Date: Sep. 20, 2018

(65) Prior Publication Data
US 2020/0014280 A1 Jan. 9, 2020

(30) Foreign Application Priority Data
Mar. 14, 2017 (DE) ...................... 20 2017 101 480.0

(51) Int. Cl.
*H02K 7/10* (2006.01)
*F16D 49/02* (2006.01)
(Continued)

(52) U.S. Cl.
CPC ............. *H02K 7/102* (2013.01); *F16D 49/02* (2013.01); *A47C 20/041* (2013.01)

(58) Field of Classification Search
CPC .. H02K 7/00; H02K 7/06; H02K 7/08; H02K 7/10; H02K 7/102; H02K 7/11;
(Continued)

(56) References Cited

U.S. PATENT DOCUMENTS 4,503,732 A * 3/1985 Schust ................. E05F 11/483
74/505
9,431,871 B2 8/2016 Wu
(Continued)

FOREIGN PATENT DOCUMENTS

DE 10 2005 063000 A1 7/2007
DE 20 2015 107 053 2/2016
(Continued)

OTHER PUBLICATIONS

International Search Report issued by the European Patent Office in International Application PCT/EP2018/056296.

*Primary Examiner* — Tran N Nguyen
(74) *Attorney, Agent, or Firm* — Henry M. Feierisen LLC

(57) ABSTRACT

The invention relates to an electromotive furniture drive comprising a drive motor (10). The drive motor (10) has a driveshaft (11) which is mechanically coupled to a brake device (13), and the brake device (13) has a looping wrap spring (15). The electromotive furniture drive is characterized in that the brake device (13) comprises a brake element (17) which is designed to apply a braking torque to the drive shaft (11) in a rotational direction. The brake element (17) is operatively connected to a coupling element (16) in a mechanical manner, and the wrap spring (15) is positioned on an outer lateral surface (161) of the coupling element (16).

13 Claims, 3 Drawing Sheets

(51) Int. Cl.
*H02K 7/102* (2006.01)
*A47C 20/04* (2006.01)

(58) Field of Classification Search
CPC ....... H02K 7/1166; F16D 65/00; F16D 65/06;
F16D 65/18; F16D 59/00; F16D 49/00;
F16D 49/02; F16H 25/00; F16H 25/20;
F16H 25/24; F16H 25/2454
See application file for complete search history.

(56) References Cited

U.S. PATENT DOCUMENTS

| | | | |
|---|---|---|---|
| 2005/0023086 A1* | 2/2005 | Szilagyi | F16D 49/02 |
| | | | 188/67 |
| 2012/0227522 A1 | 9/2012 | Wu | |
| 2013/0169008 A1 | 7/2013 | Wu | |
| 2017/0138107 A1* | 5/2017 | Müller | F16H 35/00 |

FOREIGN PATENT DOCUMENTS

| | | |
|---|---|---|
| DE | 10 2015 220680 A1 | 5/2016 |
| EP | 1 310 703 A1 | 5/2003 |
| EP | 1 637 775 A1 | 3/2006 |

* cited by examiner

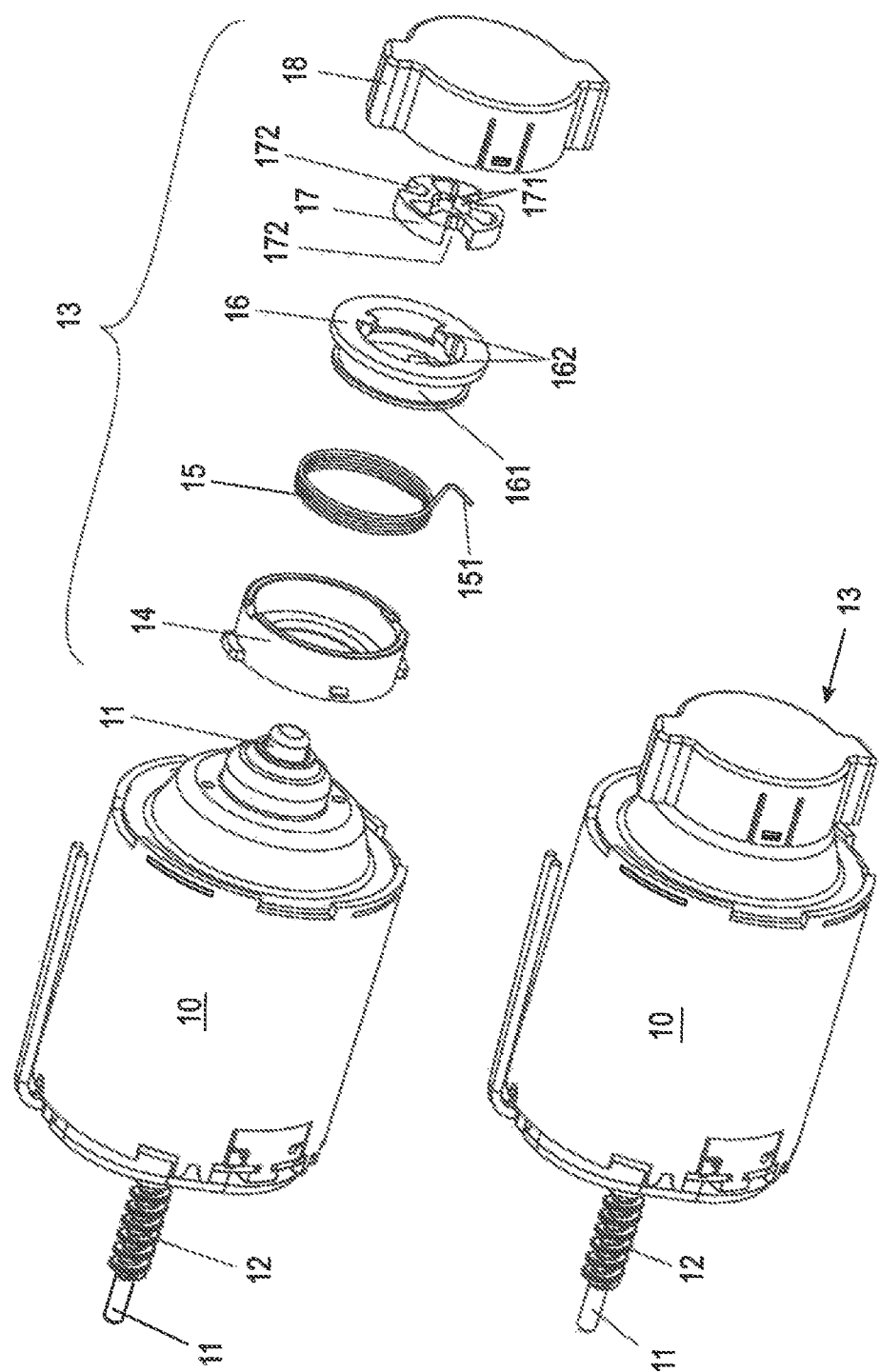

ELECTROMOTIVE FURNITURE DRIVE COMPRISING A DRIVE MOTOR WITH A BRAKE DEVICE

CROSS-REFERENCES TO RELATED APPLICATIONS

This application is the U.S. National Stage of International Application No. PCT/EP2018/056296, filed Mar. 13, 2018, which designated the United States and has been published as International Publication No. WO 2018/167094 A1 and which claims the priority of German Patent Application, Serial No. 20 2017 101 480.0, filed Mar. 14, 2017, pursuant to 35 U.S.C. 119(a)-(d).

BACKGROUND OF THE INVENTION

The invention relates to an electromotive furniture drive having a drive motor, wherein the drive motor has a drive shaft mechanically coupled to a brake device, wherein the brake device has a looping wrap spring.

An electromotive furniture drive with a drive motor and a brake device can be found, for example, in publication DE 20 2015 107 053, wherein the brake device comprises a brake element which acts directly on the drive shaft of the drive motor and generates a uniform braking torque in both directions of rotation. This allows the same braking torques to be generated regardless of the direction of rotation so that the electromotive furniture drive experiences its mechanical self-locking at standstill and an already lifted load can be safely held. A disadvantage is that the braking torque is generated in both directions of rotation of the drive shaft.

An electromotive furniture drive of the type mentioned above is known from the publication U.S. Pat. No. 9,431,871, wherein three brake elements in segment form surround the drive shaft and are encased directly by a wrap spring so that a braking torque is generated in only one direction of rotation of the drive shaft. A disadvantage here is the increased installation effort and that in addition to the pretensioning force of the wrap spring, a relatively poorly controllable additional tensioning force results from the Eytelwein wrap, which means a high tolerance in the application of the brake torques.

The present invention is based on the object of creating an electromotive furniture drive with a drive motor and a brake device, which no longer has the above-mentioned disadvantages, is also easy to install and in which the braking torques lie within a small tolerance range.

SUMMARY OF THE INVENTION

The solution to this object is provided in accordance with the invention by an electromotive furniture drive having a drive motor, wherein the drive motor has a drive shaft which is mechanically coupled to a brake device, wherein the brake device has a looping wrap spring, wherein the brake device includes a brake element which is designed to apply a braking torque to the drive shaft in one direction of rotation, wherein the brake element is in mechanical operative connection with a coupling element, and wherein the wrap spring is placed on an outer jacket surface of the coupling element.

Further advantageous embodiments are the subject matter of the dependent claims.

In an advantageous embodiment, the electromotive furniture drive has a transmission drivetrain which is driven by the drive motor and which reduces a high speed of the drive motor either to a lower angular speed or to a low linear speed. A typical transmission drivetrain has a worm gear, the teeth of which mesh with the teeth of the drive motor, and also has a worm nut lifting gear, which is supplied with rotational energy by the worm gear and transforms the rotational movement into a linear output movement.

According to a typical embodiment, the threaded spindle is fixed in a housing of the electromotive furniture drive, but rotatably mounted relative to it, and is driven in rotation by the drive motor, while a spindle nut is mounted on the threads of the spindle, which in turn executes the output linear movement when the threaded spindle rotates, and is further connected indirectly or directly to other elements such as lifting tubes, adjusting elements and/or fork heads and finally to a furniture component. When the electromotive furniture drive is operated in one piece of furniture, at least two furniture components are adjusted relative to each other. It is also possible to arrange several drive motors and/or worm nut lifting gear units in one housing.

The transmission drivetrain of the present electromotive furniture drive is not self-locking so that the connected furniture component would move in the direction of gravity when the drive motor is switched off. The brake device generates a braking torque that counteracts the gravity-induced lowering of the connected furniture component. Prior art brake devices have a brake element which generates a constant braking torque independent of the direction of rotation of the drive motor. The brake element has spring-elastic sections, for example, and directly or indirectly provides brake surfaces which are directly connected to the drive shaft of the drive motor. A braking torque that can always be generated uniformly is thus given.

The brake torque that can be generated is relatively small compared to the drive torque of the drive motor and the brake torque can be adjusted in advance by dimensioning the brake element and the pressure forces. The level of this preset braking torque is selected to provide self-locking of the transmission drivetrain, including a safety margin for the normal operating condition.

According to the invention, the brake element is mechanically connected to a coupling element. The simplest mechanical operative connection is provided by a kind of claw coupling, wherein at least one claw, preferably three claws arranged uniformly in the circumference, are provided with the corresponding recesses in each case so that sections of the brake element and coupling element intermesh in a claw-like manner. The claw-like connection is provided with a small play and is positive-locking. The brake element can be arranged completely or alternatively at least in sections in a concentric recess of the coupling element. Other forces, such as radial forces exerted by the wrap spring on the coupling element, are therefore not transmitted to the brake element so that they do not affect the brake element.

The coupling element has a jacket surface which is preferably designed as an outer jacket surface and alternatively as an inner jacket surface. For example, the jacket surface is cylindrical. A looping wrap spring with preferably more than one wrap winding is frictionally connected to the jacket surface. The free end of the wrap spring is designed as a retaining element, for example in the form of a hook, and is intended for fastening in a housing. Such housings are formed by the housing of the drive motor or may alternatively be attached to the housing of the drive motor or further such housings may be formed by the housing of the electromotive furniture drive or one of its components itself. The retaining element is arranged in such a way that it cannot rotate about the axis of the drive shaft and is stationary relative to the drive motor when the drive motor is in operation.

When the wrap spring is not mounted, it has a diameter which is an oversize compared to the diameter of the jacket surface and after mounting. If the wrap spring is placed on an outer jacket surface after assembly, the inner diameter of the unassembled wrap spring is slightly smaller than the outer diameter of the jacket surface of the coupling element. Because the wrap spring is placed on the coupling element with more than one wrap winding and with an oversize, according to Eytelwein's wrap a slippage or a transmission of a torque of the coupling element occurs in a first direction of rotation with a very low height, which is due to the spring pretension providing the oversize after assembly has been completed. In the second direction of rotation of the coupling element, however, very high torques are transmitted between the coupling element and the wrap spring, so that if a predetermined number of wraps is exceeded, a frictionally tight connection is practically achieved. The brake device is configured so that the second direction of rotation corresponds to the direction of rotation of the drive motor, which is intended to move the connected furniture component in the direction of gravity.

In an inventive manner, a brake device for an electromotive furniture drive has thus been created which, when the connected furniture component moves against the force of gravity, is practically designed as a freewheel and the brake element has no or only a small braking extension due to the above-mentioned oversize. In the second direction of rotation of the drive shaft, however, the brake element forms with the coupling element a rotationally fixed frictional connection or a connection subject to rotational braking with the wrap spring, with the result that the spindle drivetrain appears to be self-locking when the drive motor is switched off and the load connected to the electromotive furniture drive is held securely in position.

A further inventive aspect is the above-mentioned decoupling in the form of a claw coupling between brake element and coupling element, because neither the spring pretension of the looping wrap spring forming the oversize nor the high braking forces exerted by the wrap spring itself during the second direction of rotation and producing this by the wrap spring itself have any effect on the brake quality of the brake element, because no forces of the wrap spring can be exerted on the brake element by the play-related connection between the brake element and the coupling element, but only forces in the circumferential direction can be transmitted to the brake element in the form of torques, so that the brake element is always in the same frictional torque entrainment connection with the drive shaft, irrespective of the direction of rotation and the force generated by the wrap spring.

In another advantageous embodiment of the electromotive furniture drive, an axial bearing is arranged centrally on the coupling element. The axial bearing, for example in the form of a plain bearing, can be essentially disc-shaped and held by webs running radially outwards. The axial bearing with a first bearing surface is preferably in contact with an end face of the drive shaft. Alternatively or additionally, the axial bearing with a second bearing surface can rest against a cover of a housing of the brake device. The axial bearing prevents axial movement of the coupling element. Such a movement could lead to an axial oscillation of the coupling element on the drive shaft, which is accompanied by undesirable vibrations and noise development of the drive motor.

BRIEF DESCRIPTION OF THE DRAWING

The invention will be explained in more detail below by reference to embodiment examples shown in the drawings, wherein:

FIG. 2 shows a first embodiment of a drive motor with a brake device of an electromotive furniture drive in an isometric representation;

FIG. 3 shows the embodiment according to FIG. 2 in a partially exploded view, and;

FIG. 1 first shows a bed as an example of a piece of furniture having an electromotive furniture drive in an isometric view.

DETAILED DESCRIPTION OF PREFERRED EMBODIMENTS

Figure 1:
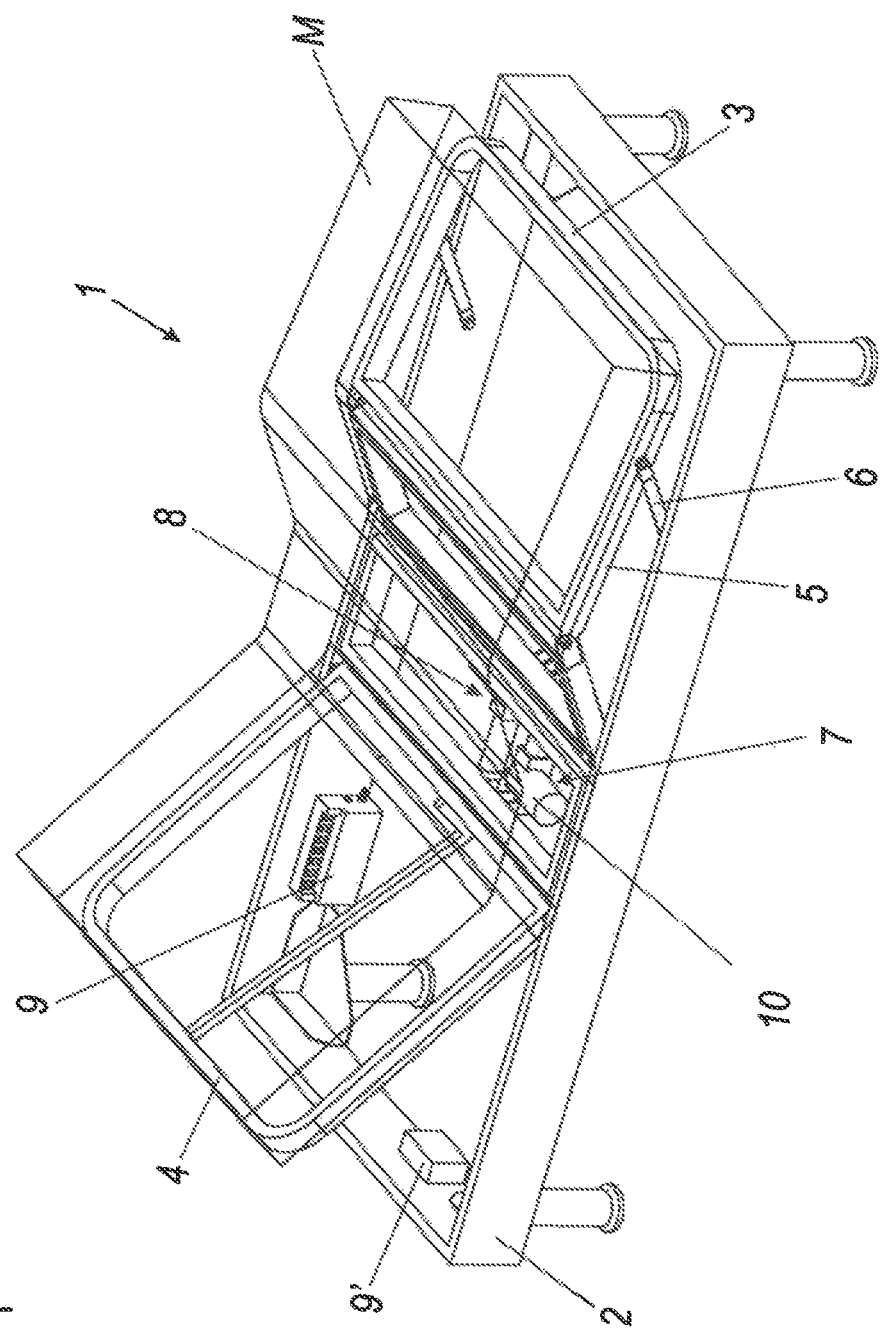
FIG. 1 shows a piece of furniture with an electromotive furniture drive.

Bed 1 has at least one support element 3 to accommodate upholstery or a mattress M, for example. Bed 1 can be designed as a single bed for one person or as a double bed for several persons. The supporting element 3 is designed, for example, as a slatted frame, as a flat supporting surface or the like and is mounted on or inserted into a base element 2, here a frame with feet, with which the bed 1 is set up at an installation location, e.g. a floor.

In the example shown, support element 3 has a back part 4 and a leg part 5 which are movably mounted relative to a fixed middle part or relative to the base element 2. This movable arrangement is realized here by means of a so-called motion fitting 6. The movement can be formed to be displaceable and/or pivotable.

The movably mounted back part 4 and the leg part 5 are each coupled to an electromotive adjustment drive 7, 8. The back part 4 is coupled to the electromotive adjustment drive 7. The electromotive adjustment drive 8 is provided for moving or adjusting the leg part 5.

The electromotive adjustment drives 7, 8 are designed as linear drives. The linear drives have one or a number of drive motors 10. According to the application, the drive motor 10 is equipped with a brake device, which is shown in more detail in the following FIGS. 2 to 5 in various configurations.

Each drive motor 10 is followed by a speed reduction gear having at least one gear stage. The speed reduction gear can be followed by another gear, for example in the form of a threaded spindle gear, which generates a linear movement of an output member from the rotary motion of the electric motor. The last gear member or a further element connected to it forms the output member. The output member of the respective electromotive adjustment drive is connected to the respective furniture component (back part 4, leg part 5) or alternatively to a component connected to the base element 2, so that, when the electric motor of the respective adjustment drive 7, 8 is operated, the movable furniture components 4, 5 are adjusted relative to one another or relative to the base element 2.

The electromotive adjustment drives 7, 8 are connected to a control unit 9. This connection can be designed, for example, as a pluggable cable connection, which is not shown here in detail. In the example shown, control unit 9 is connected to an external power supply unit 9', which can be connected to a mains plug with a mains connection via a mains cable not shown in this example. The external power supply unit 9' provides a DC voltage in the range of 24-30V for the power supply of the electromotive furniture drive, in particular the electromotive adjustment drives 7, 8. In an alternative embodiment, a power supply unit can be integrated in the control unit 9 so that the external power supply unit 9' can be dispensed with and the control unit 9 can be connected directly to the mains with a mains cable.

FIG. 2 shows separately a drive motor 10 of an electromotive furniture drive, for example the electromotive furniture drive shown in FIG. 1. The drive motor 10 has a drive shaft 11 with a toothing 12 and a brake device 13. The toothing 12 is connected to the toothing of a gear not shown in FIG. 2. In the example shown, the brake device 13 is removed and arranged opposite the toothing 12 on the other side of the drive motor 10. In alternative embodiments, it is also possible to arrange the toothing 12 and the brake device 13 on the same motor side.

FIG. 3 shows the arrangement according to FIG. 2 in a partially exploded view in order to reproduce the internal structure of the brake device 13 and its interaction with the drive shaft 11. In the diagram shown in FIG. 3, the drive shaft 11 also stands out on the side on which the brake device 13 is arranged, relative to the housing of the drive motor 10. A brake element 17 is mounted on the drive shaft 11. The internal clearance of the brake element 17 in the unassembled state is slightly smaller than the external diameter of the drive shaft 11, so that the brake element 17 with brake sections 171, which are in the form of hollow cylinder sections, enters into a frictional oversize connection with the drive shaft 11. The oversize is set so that the brake element 17 on the drive shaft 11 always slips during normal operation of the drive motor 10. The brake element 17 is meander-shaped in cross-section and formed from an elastic material so that a continuous oversize-producing and frictional spring pretension of the internal clearance occurs relative to the drive shaft.

In addition, a coupling element 16 is assigned to the brake element 17, wherein the connection between brake element 17 and coupling element 16 has play in the assembled state. This means that only circumferential forces in the form of torques can be exchanged and transmitted between brake element 17 and coupling element 16. Other forces, such as radial forces exerted by the wrap spring 15 on the coupling element, are therefore not transmitted to the brake element 17 so that they do not affect the brake element 17.

The coupling element 16 has an outer jacket surface on which a wrap spring 15 with more than one turn is mounted. In this embodiment, the wrap spring 15 is formed from a steel wire, wherein the steel wire has a round cross-section. In this example, a free end of the wound wrap spring 15 is designed as a retaining element 151 in the form of a hook. The wrap spring 15, the coupling element 16 and the brake element 17 are arranged according to this embodiment in a housing 14 with a cover 18. The housing 14 is formed to be fixedly attachable to the drive motor 10. Finally, in the normal operating position of the drive motor 10, the retaining element 151 of the wrap spring is arranged in a stationary manner relative to the housing of the drive motor 10.

The arrangement, consisting of wrap spring 15, coupling element 16 and brake element 17, is also designed as a modular system. It is therefore also possible that, for example, by replacing the brake element 17 with another, an adapted braking character of the drive motor 10 and thus a different degree of self-locking of the connected spindle nut lifting gear can be developed. Furthermore, the housing 14, 18 or a portion of the housing 14, 18 or a portion of the housing of the drive motor 10 has more than one retaining device for fastening the retaining element 19, so that the wrap spring 15 can be mounted selectively in a first or in a second direction relative to the drive shaft 11. After assembly, the winding direction of the wrap spring 15 is arranged either clockwise or counterclockwise so that the drive motor 10 or the brake device 13 experiences a braking torque either in a first or in a second direction of rotation of the drive shaft 11.

Figure 4:
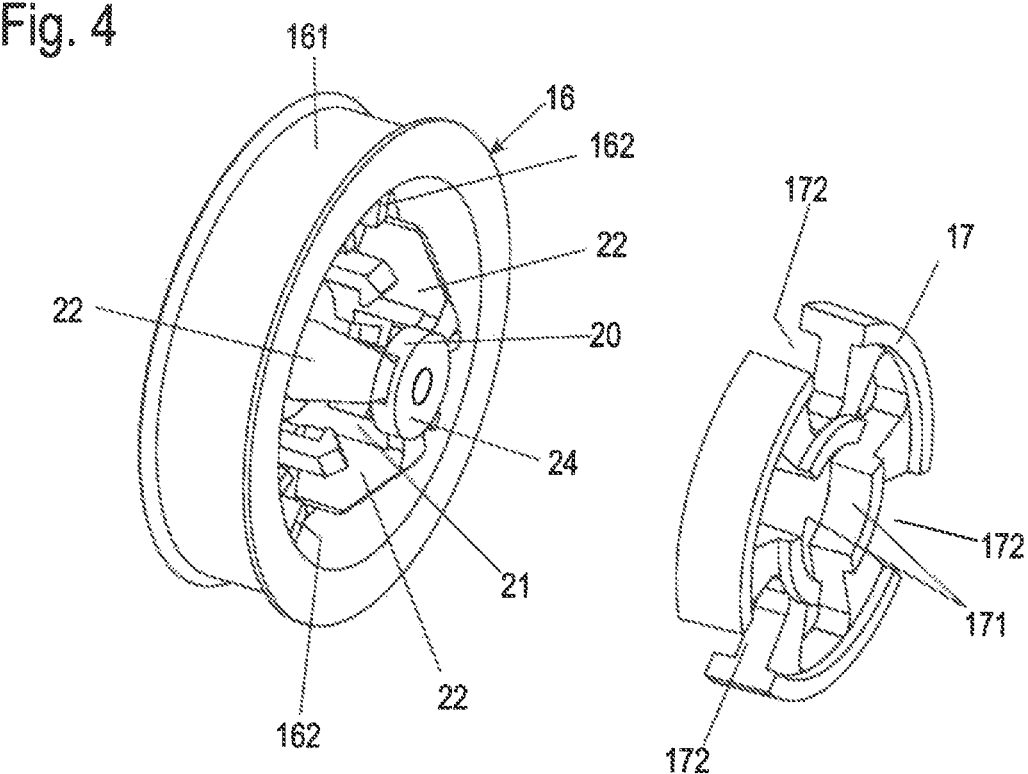
FIGS. 4, 5 each show an isometric representation of a coupling element and a brake element of an alternative embodiment of a brake device, viewed from two different directions.
Figure 5:
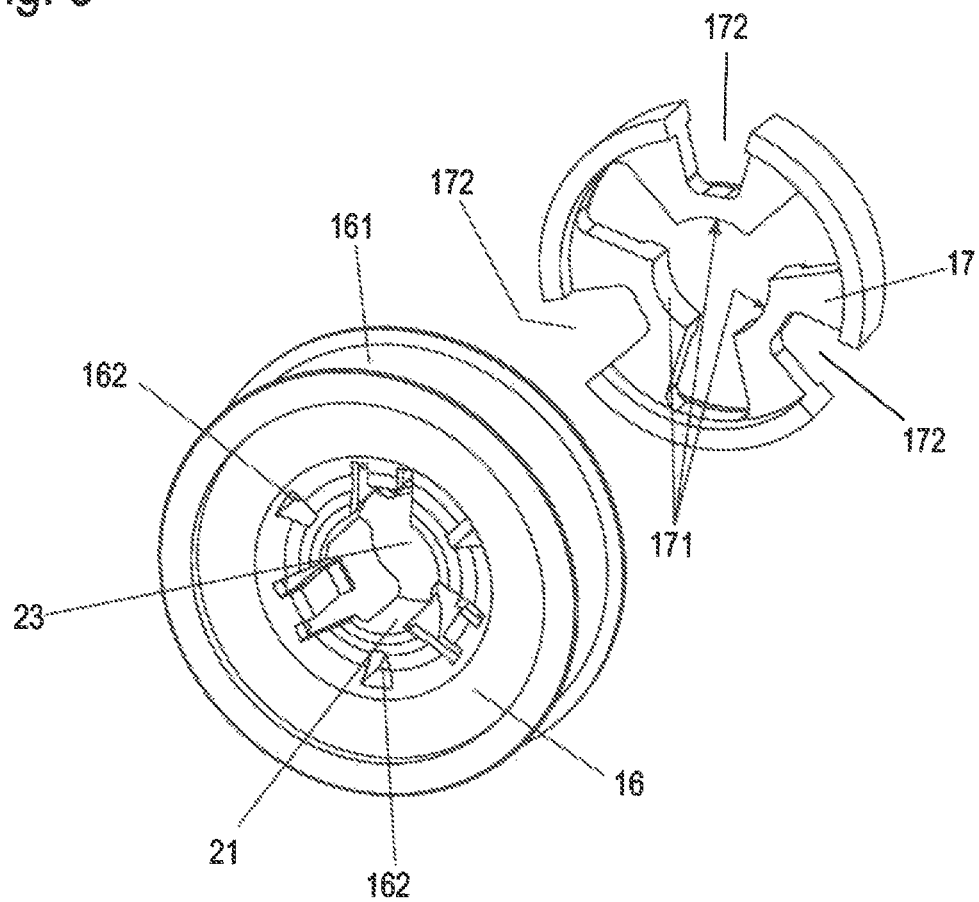

FIGS. 4 and 5 illustrate a variant of coupling element 16 and brake element 17 in an exploded view. The two figures reproduce the mentioned elements from different directions. The coupling element 16 has an axial bearing 20 according to this embodiment, which is connected to the base body of the coupling element 16 via webs 22 arranged in the center of rotation.

The axial bearing 20 has a first bearing surface 23 facing the drive shaft 11, which is designed at least in sections for a sliding bearing connection with the drive shaft 11. The second bearing surface 24 facing away from the drive shaft 11 is designed at least in sections for a sliding bearing connection with the cover 18. At least one of the bearing surfaces 23, 24 forms a point bearing connection or a connection similar to a point bearing connection with the corresponding drive shaft 11 or with the cover 18, wherein the respective axial bearing is founded in the center of rotation of the drive shaft 11. Alternatively, at least one of the bearing surfaces 23, 24 is designed as a flat bearing surface 23, 24. In FIG. 4, an injection molding starting point can be seen centrally in the storage area 24. This is arranged in a recessed manner so that the material does not protrude beyond the bearing surface 24.

The webs 22 themselves have running surfaces 21, which are in a plain bearing connection with the drive shaft 11. This plain bearing connection is designed as a transition tolerance with play or, if necessary, with a slight oversize, so that the running surfaces 21 exert a centering and supporting effect on the coupling element 16 and are able to support and bear it concentrically to the drive shaft 11, which in particular ensures the smooth running of the brake device 13.

It is initially described in closer detail that the housing 14 is designed as an integral molded part with a housing section of the drive motor 10, for example with the bottom or with a bearing shield of the drive motor 10. In a further development of the example in FIG. 3, but not described in more detail, drive motor 10 and housing 14 have incisions, projections, protrusions and/or retractions which are designed to correspond to one another and are thus used as fastening means for fastening the housing 14 to the drive motor 10. The first fastening means are designed as non-detachable fastening means, so that the connection between housing 14 and drive motor 10 appears to be one piece. Further and thus alternative fastening means are designed as plug-in clamp fasteners. Other fastening means comprise at least one latching means. Combinations of different fastening means can also be used.

What is claimed is:

1. An electromotive furniture drive, comprising:
   a brake device including a looping wrap spring;
   a drive motor including a drive shaft which is mechanically coupled to the brake device, said brake device including a brake element configured to apply a braking torque to the drive shaft in one direction of rotation;
   a coupling element in mechanical operative connection with the brake element, said looping wrap spring being placed on an outer jacket surface of the coupling element; and an axial bearing arranged centrally on the coupling element.

2. The electromotive furniture drive of claim 1, wherein the brake element and the coupling element are connected to one another by a positive-locking connection.

3. The electromotive furniture drive of claim 1, wherein the brake element and the coupling element are connected to one another with play.

4. The electromotive furniture drive of claim 1, further comprising a claw coupling to connect the brake element and the coupling element to one another.

5. The electromotive furniture drive of claim 4, wherein the claw coupling is formed by a radially inwardly facing claw of the coupling element and a corresponding recess of the brake element, with the claw engaging in the recess.

6. The electromotive furniture drive of claim 1, wherein the wrap spring is configured to wrap around the coupling element with more than one turn.

7. The electromotive furniture drive of claim 1, wherein the looping wrap spring includes a retaining element at a free end of the looping wrap spring.

8. The electromotive furniture drive of claim 7, wherein the retaining element is fixed via a housing of the brake device in a stationary manner relative to the housing of the drive motor.

9. The electromotive furniture drive of claim 7, wherein the retaining element is a hook formed from an end section of the looping wrap spring.

10. The electromotive furniture drive of claim 1, wherein the drive shaft has a toothing for driving a gear stage.

11. The electromotive furniture drive of claim 10, wherein the brake device and the toothing are arranged on different sides of the drive motor on the drive shaft.

12. The electromotive furniture drive of claim 1, wherein the axial bearing has a first bearing surface via which the axial bearing rests against an end face of the drive shaft.

13. The electromotive furniture drive of claim 1, wherein the axial bearing has a second bearing surface on a cover of a housing of the brake device.

* * * * *